May 19, 1931.  M. H. LOUGHRIDGE  1,805,551
BRAKING SYSTEM
Filed Sept. 2, 1924   5 Sheets-Sheet 1

INVENTOR.

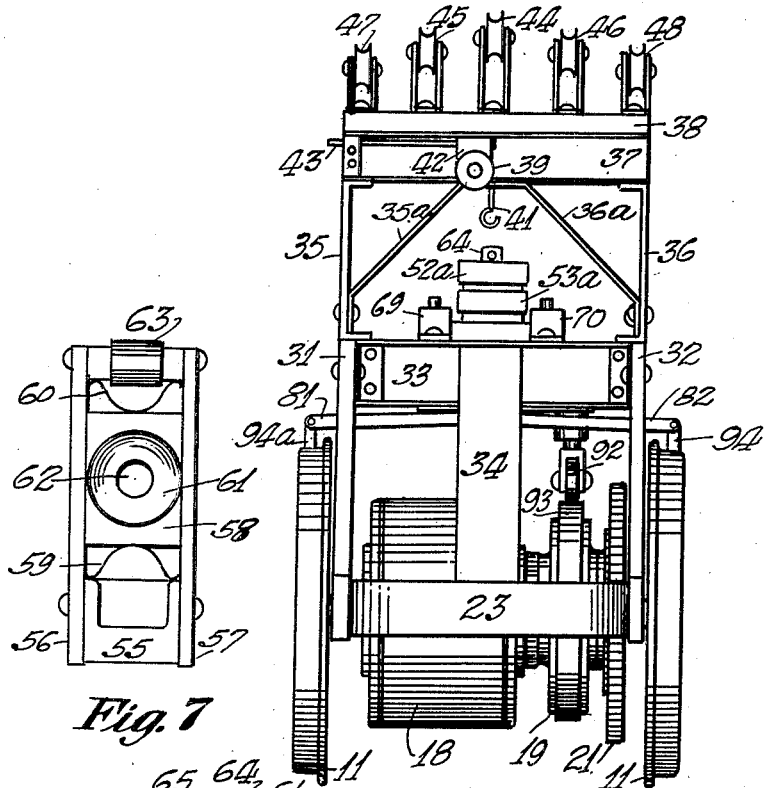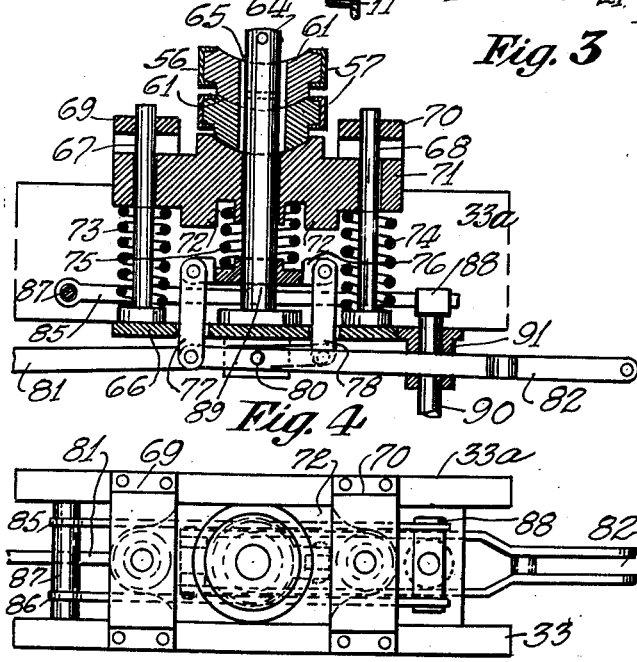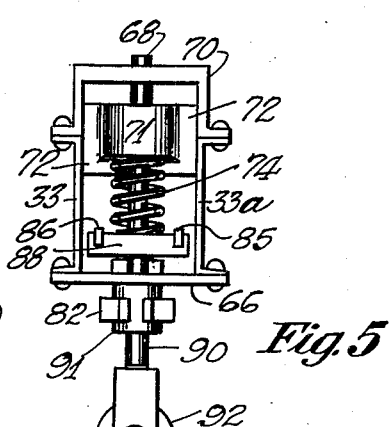

May 19, 1931.  M. H. LOUGHRIDGE  1,805,551
BRAKING SYSTEM
Filed Sept. 2, 1924  5 Sheets-Sheet 3
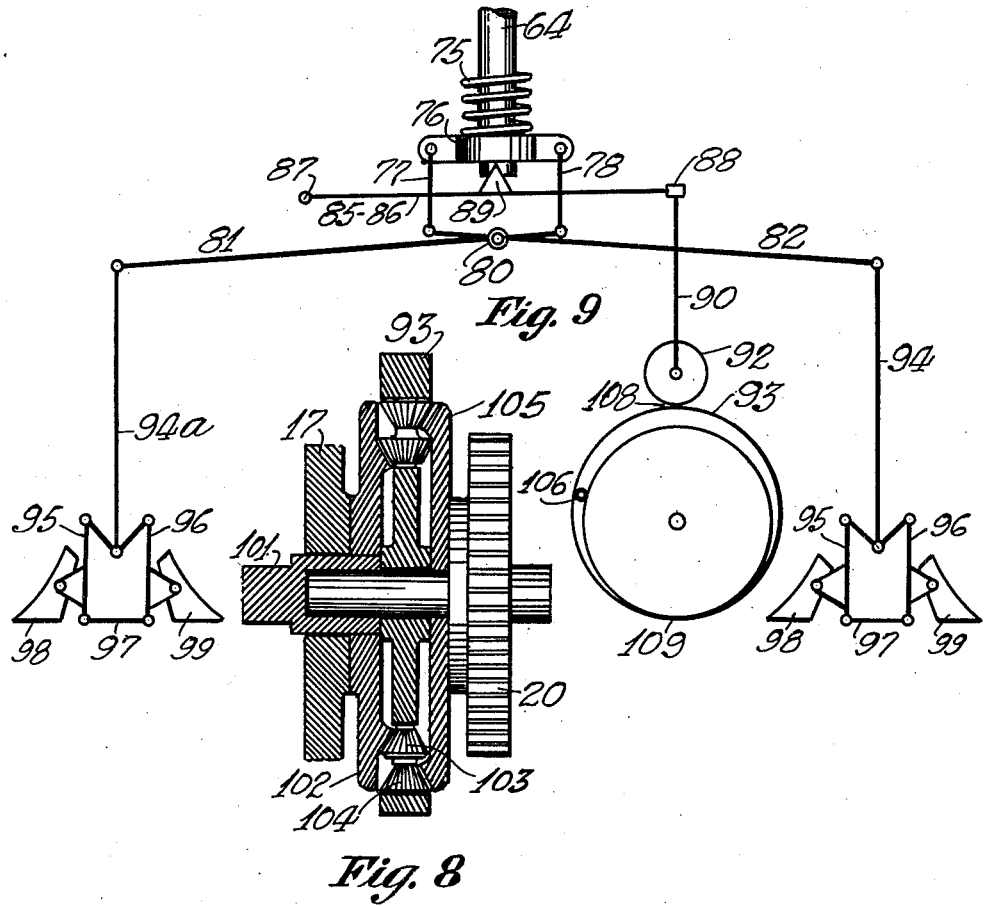
INVENTOR
Matthew H. Loughridge May 19, 1931. M. H. LOUGHRIDGE 1,805,551
BRAKING SYSTEM
Filed Sept. 2, 1924   5 Sheets-Sheet 4

Matthew H. Loughridge INVENTOR.

May 19, 1931.   M. H. LOUGHRIDGE   1,805,551
BRAKING SYSTEM
Filed Sept. 2, 1924    5 Sheets-Sheet 5

INVENTOR.
Matthew H. Loughridge

Patented May 19, 1931

1,805,551

UNITED STATES PATENT OFFICE

MATTHEW H. LOUGHRIDGE, OF BOGOTA, NEW JERSEY

BRAKING SYSTEM

Application filed September 2, 1924. Serial No. 735,276.

This invention relates to braking systems of general application where it is desired by means of brakes to take up the kinetic energy of moving parts and, amongst other things has for its objects to provide a brake which is operated by the difference in speed between two moving parts, which is operated in proportion to the weight of the load and may be operated by the load, which sets up conditions by the driving device, when starting, for operating the brakes when stopping, and a brake that has an independent motion between the driving and driven parts whereby the braking system is operated, a brake in which a graduated braking effect is obtained controlled by the momentum of the moving parts, a braking effect that is automatically operative for either direction of running and a braking effect that may be remotely controlled. The objects of the system will be more fully understood from the following specification and the accompanying drawings, in which, Fig. 1 is a side elevation of a railway truck embodying my invention, Fig. 2 is a plan view corresponding to Fig. 1 with part of the superstructure removed to show the internal mechanism and Fig. 3 is an end elevation of a railway truck corresponding to Fig. 1.

Figure 1:
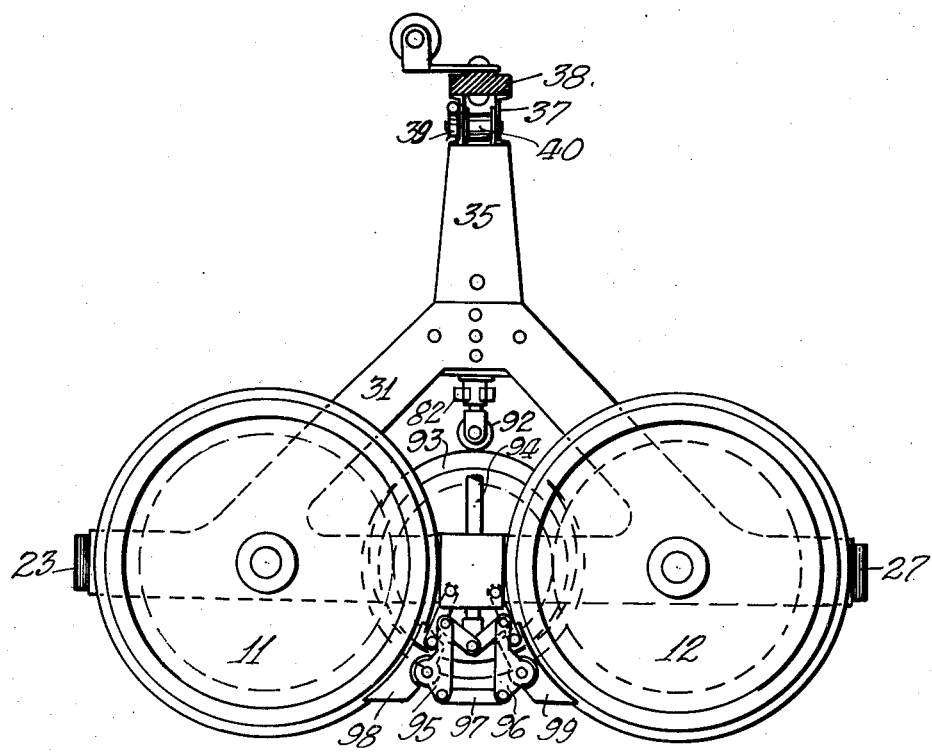
Figure 2:
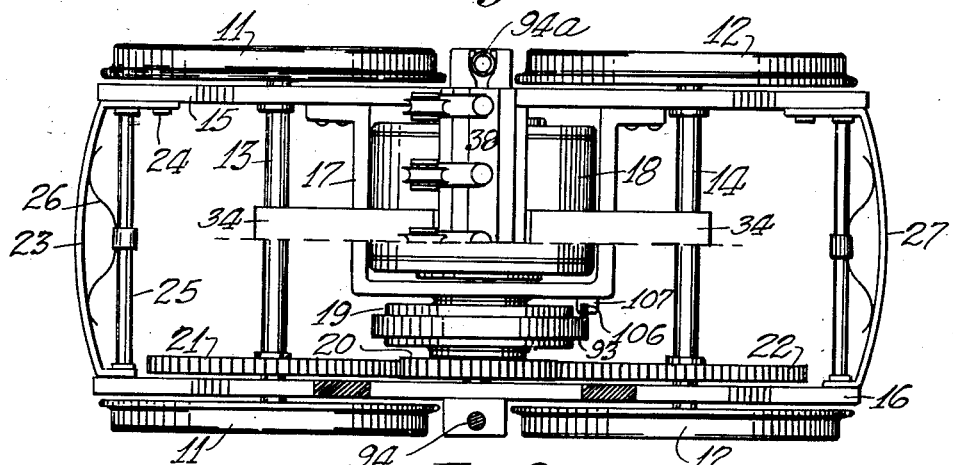

Fig. 4 is a sectional elevation of the king pin, bolster, coupling and brake levers as used in the truck in Figs. 1, 2 and 3. Fig. 5 is an end view and Fig. 6 is a plan view of the construction shown in Fig. 4. Fig. 7 is a plan view of the coupling arm, Fig. 8 is a cross-section of the differential mechanism used in the drive and Fig. 9 is a diagram of the operating levers controlling the braking system.

Figure 10:
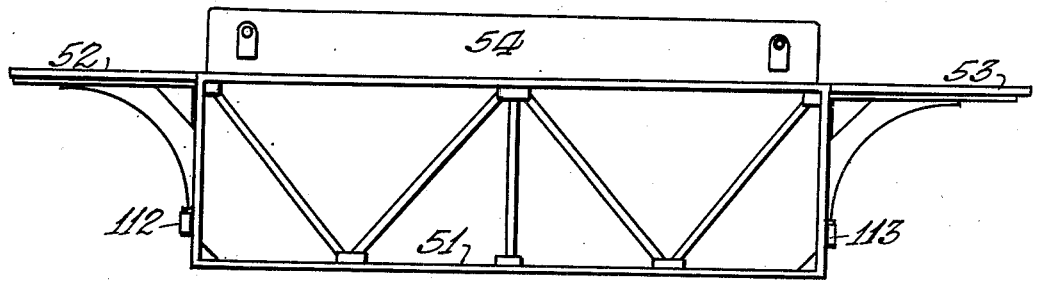
Figure 11:
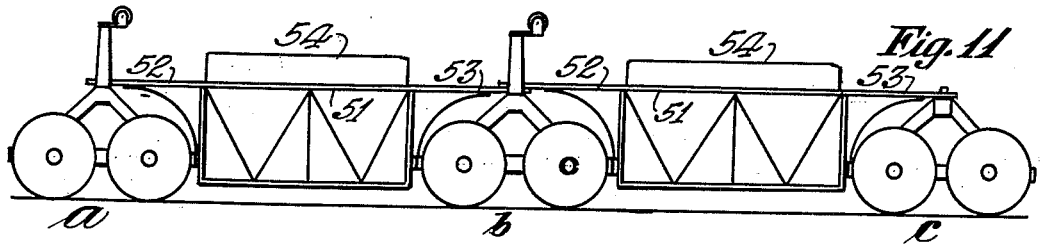
Figure 12:
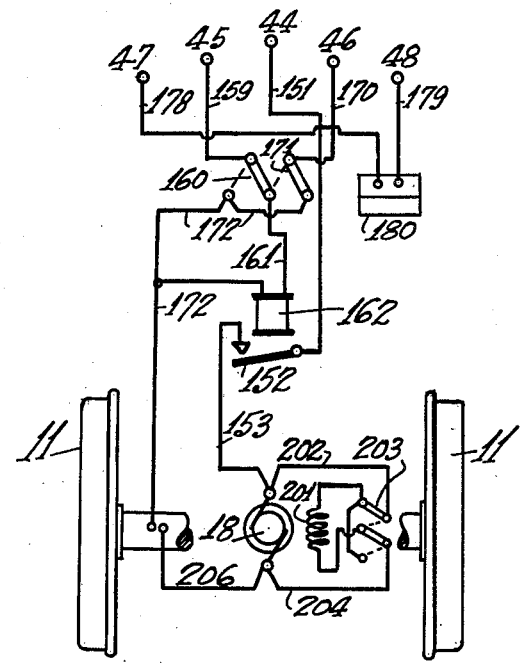
Figure 13:
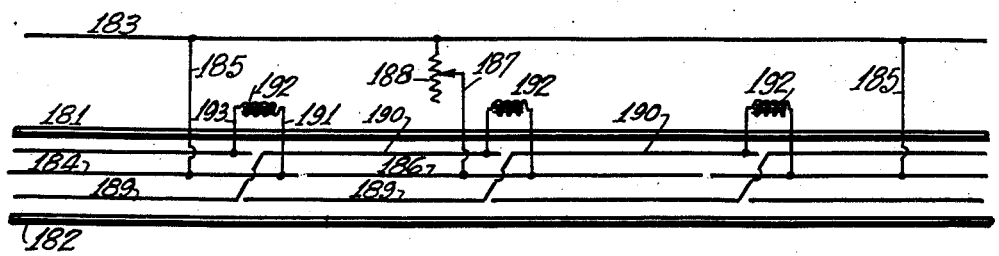

Fig. 10 is the frame of a car with a container and Fig. 11 shows the make up of a train using trucks similar to Fig. 1 and car frames similar to Fig. 10. Fig. 12 is a diagram of the wiring for a truck and Fig. 13 is a track wiring plan including a block system that may be used with this invention.

The present invention is illustrated mainly in connection with train brakes as it is believed that braking has reached its highest development in this art, however, it should be understood that the invention is of general application and is not limited to railway systems.

It is well known in railway brakes that the highest efficiency is obtained when the braking power is just below the power of adhesion. That is, the brakes are most effective just before the wheel slips on the rail. When slipping occurs the wheels tend to continue slipping and the brake loses its efficiency. This has led to the introduction of the 90% brake in which the braking force is 90% of the adhesion of an empty car, the adhesion, however, increases with the load so that, in practice, such a brake is not more than 40% of the adhesion of a loaded car. This condition has been somewhat relieved by operating a braking mechanism controlled by the load on the car springs. In the present invention this difficulty is overcome by using the weight of the car itself to operate the brakes and it will be shown that this operation is not only proportional to the load but is proportional to the moments of the load.

Adhesion varies not only with the load but also with the coefficient of friction between the wheel and the rail and this, in turn, is influenced by weather and other conditions so that human direction has been regarded as necessary in applying train brakes. Again, for bringing a train to a smooth stop the brakes must be operated with relation to speed being alternately applied and released so that the stop is made without injury to the equipment. The braking system contemplated by this invention operates automatically and alternately applies and releases the brakes as the vehicle maintains its speed or is retarded. This condition is maintained with reference to speed and grades or anything that will affect the speed of the vehicle.

The present invention comprises a lost motion in the drive between the motor and the running gear so arranged that as the motor takes up this lost motion, part of the load on the truck is raised and is maintained in this position as the motor drives the truck. When the motor ceases to drive the truck and slows down, the continued movement of the truck takes up the lost motion in the reverse direction and the weight of the load is lowered. A system of levers are associated with the raising of this weight which operate a foundation brake gear to apply the brakes as the weight is lowered and to release the brakes as the weight is raised.

The preferable method of obtaining lost motion is by the use of a differential mechanism in the drive. The planetary member of the differential has a limited free movement through which it is moved by the difference in speed of the driving and driven parts. The periphery of this planetary member is eccentric so that as it rotates in one direction the wide side from the centre of the eccentric is raised and as it rotates in the other direction, the narrow side from the centre of the eccentric is raised. A member bearing upon this eccentric is raised and lowered therewith and correspondingly raises and lowers the bolster and operates the braking levers. When the motor armature exceeds the speed of the driven mechanism the wide side of the eccentric is raised and remains in this position, releasing the brakes, as long as the motor continues to drive the mechanism. When the speed of the mechanism exceeds the speed of the armature, the eccentric moves in the opposite direction, raising its narrow side and applying the brakes until the speed of the mechanism is reduced below the speed of the armature. When this condition is reached the eccentric is again moved to raise its wide side and release the brakes and, when the speed of the armature is once more below the speed on the mechanism, the eccentric is again lowered applying the brakes until the speed of the mechanism is again below the speed of the armature and so on, alternately the brakes are applied and released until the mechanism or vehicle is stopped. This, in effect, produces a graduated braking application according to conditions.

In order to prevent the brake application the motor must be driven continuously at a speed equal to the speed of the mechanism and if the motor is remotely controlled it is apparent that the speed of a vehicle operated by such a motor can be easily maintained within predetermined limits.

When a railway car is running at speed on a grade and the power to the motor is shut off it is apparent that at the instant the power is shut off the speed of the motor and the speed of the mechanism are equal. The armature of the motor however, has angular momentum only to continue its motion while the vehicle has linear momentum in addition to the momentum of its rotating parts. The angular momentum of the armature is not influenced by grades, curves or other conditions. Its speed simply dies down through a period which is proportional to its initial speed and it may be provided with a fly wheel where this period is to be prolonged. The momentum of the vehicle which has to be overcome by the braking system is accelerated on down grades although the speed of the vehicle may be retarded on curves. The application of the brakes, however, is controlled by the deceleration of the motor armature and as soon as power is restored to the motor the brakes are released and acceleration to full speed is resumed. If the vehicle is at rest on a down grade and starts to run away, then the speed of the mechanism exceeds the speed of the armature which is at rest and the brakes are immediately applied. If the power to the motor is shut off on an ascending grade the vehicle will come to a stop in a comparatively short distance and if this distance corresponds to the deceleration of the armature a natural stop will be made without the application of the brakes. If a natural stop is made and the brakes are not applied, the vehicle may run forward by driving the motor armature backwards; however as soon as the armature, running free, acquires momentum and accelerates above the corresponding speed of the vehicle, the brakes are applied by the rotation thus applied to the planetary member.

The eccentric is designed to operate in both directions so that it will control a vehicle running in either direction.

This invention embodies at least three leading principles in braking, namely; the power for applying the brakes is derived from the load; the brakes are operated through a differential mechanism associated with the driving power of the mechanism, and a lost motion is provided in the operation of the mechanism which leads to a graduated braking effect. Each of these principles may be used alone, or any combination of them may be used, each with the other, or with other systems of braking.

Attempts have been made to secure braking effects proportional to the load, particularly in railroad vehicles, in which the depression of the springs by the loading operated to increase the leverage of the braking system, or to increase the cylinder pressure in pneumatic braking systems. In such applications the load does not constitute the braking power, acting by the force of gravity.

Another arrangement proposed for this purpose comprises a vertical lever formed in a cam at one end and connected with the drawbar of the vehicle at the other end. When tilted from the vertical in either direction by the movement of the drawbar, the cam of this lever transfers the load of the vehicle body to the springs, but when the lever is vertical the load of the body is brought directly upon the running wheels through the brake shoes. The only way in which the brakes can be released with this arrangement is to maintain a constant pull, or push on the drawbar, which, ordinarily does not prevail in practice. The brakes will not operate at all if the drawbar is not released to its mid position throughout the train and a graduated brake application cannot be obtained by this construction. In the present invention the brakes are applied individually on each car through a graduated action and the braking power for each car is derived from the weight of the body and therefore is proportional to the loading of the car.

Braking systems have been operated by a mechanism controlled by an endless screw in which the screw, or its associated mechanism is driven from two sources and when the speed of one of these drives exceeds the corresponding speed of the other, the screw operates to apply the brakes, and when the relative speed of the drives is reversed, the brakes are released. The braking mechanism operates through a friction clutch without providing for a graduated action.

The present invention uses a differential gear of the well known type in which the driving and driven gears are connected by a planetary member which operates the braking mechanism or brake gear. This planetary member has a limited free movement in either direction and the brakes are gradually applied as this free movement is taken up. The brakes remain applied indefinitely by the gravity of the load and are automatically released just before the driven mechanism is started and at the same time energy is stored up for operating the brakes when making the next stop. Thus, under normal conditions, the brakes remain applied by gravity and are released only for running conditions.

The planetary member of the differential gear is formed on an eccentric, or in such a way as to raise the load upon starting as the lost motion of this member is taken up. This offers a certain amount of resistance to the movement of the planetary member proportional to the load which is transmitted to the driven member with the result that a graduated starting torque is applied to the driven member, thus insuring a smooth, easy start from a position of rest, at the same time the motor armature accelerates rapidly as the planetary member is rotated thereby simplifying the starting torque and the control of the starting current to the motor armature.

The drawings illustrate a type of railway car designed for automatic operation on which the brakes are automatically controlled but this is not to be regarded as limiting in any way the application of the invention.

*Railway trucks*

In the drawings 11 represents one pair of wheels and 12 represents the other pair of wheels of a truck having the side frames 15 and 16 mounted upon the axles 13 and 14. A bracket 17, Fig. 2 supports the motor 18 and the differential mechanism 19. This mechanism drives the gear 20 which meshes with the spur gears 21 and 22 on the axles of the running wheels thereby propelling the truck. A bumper 23 is provided at one end of the frames 15—16 and curved on an arc struck from the centre of the truck. This bumper is slidably supported by the bar 25 and is held horizontal by the pin 24. The impact on the bumper is absorbed by spring 26. A corresponding bumper 27 is provided at the opposite end of the truck.

The side frames 15 and 16 are developed into upstanding triangular members 31 and 32. Fig. 3 which supports the cross-head 33 trasversely over the centre of the truck. A pair of inclined guard plates 34 as shown in Figs. 2 and 3 are secured to the cross-head and extend to the wheel axles.

The vertical arms 35 and 36 are supported by the cross-head 33 and support the horizontal channel 37, being braced thereto by the angles 35a and 36a, Fig. 3. The channel 37 supports a bar of insulation 38 which carries the trolley contactors 44, 45, 46, 47 and 48. A hoist comprising the worm wheel 39, drum 40, hook 41, worm 42 and operating shaft 43 is secured to the channel 37 in such a position that the hook 41 is over the centre of the truck.

One form of car frame for use with these trucks is shown in Fig. 10 in which 51 is a skeleton steel structure designed to support the container 54 which is detachable. Coupling arms 52 and 53 extend from the ends of 51 as shown and level with the top thereof so that the centre of gravity is always below the coupling arms. The coupling arms, Figs. 4 and 7, are formed of channel bars 56 and 57 secured to the member 55 of the frame 51. On these channels the coupling plate 58 has a sliding motion which is opposed by the springs 59 and 60. The coupling plate is concavo-convexed at 61 in a spherical depression and is provided with an aperture 62 to receive the coupling pin 64. The hole 62 is larger than the pin as indicated at 65 so that the spherical surfaces of the coupling may roll freely upon each other when assembled as shown in Fig. 4. A train coupled in this way can not only turn sharp curves and the crown of grades without straining the coupling pin but also, the car frame itself may swing through a free arc in response to centrifugal force without straining the coupling pin or the truck. The suspended car frame with the low centre of gravity will give this part the motion of a pendulum. The channels 56 and 57 are provided at the outer end with a roller 63 which engages the inclines 34 when a frame is raised by the hoist 41 for coupling purposes.

King pin and bolster

The cross-head as indicated in Fig. 5, is formed in a channel section comprising the plates 33 and 33a. These are secured at the base by the plate 66 which supports the king pin 64 on the vertical centre of the truck and supports the guide pins 67 and 68 as shown. Guide pin 67 is supported at the top by the bracket 69 and guide pin 68 is supported at the top by bracket 70. The bolster 71 is arranged to slide vertically on the king pin 64 and on the guide pins 67 and 68 and has an extended section in the centre at 72 which engages the sides of the channel formed by 33 and 33a. The bolster thus provides a rigid support for the king pin.

The bolster is supported by the coil spring 73 on guide pin 67 and coil spring 74 on pin 68 so that the load on the bolster is spring mounted. The load on the bolster is also supported by the plate 76 through the central spring 75.

Braking levers

For the operation of the brake levers reference should be had to Fig. 4 and to the diagram in Fig. 9. The plate 76 is slidable on king pin 64 and is supported from two independent sources. One of these source is obtained through link 77, lever 82 pivoted at 80 and rod 94, in combination with link 78, lever 81 pivoted at 80 and brake rod 94a. By this arrangement, tension is applied to rods 94 and 94a to support the load on the bolster. The other support comprises the horizontal levers 85 and 86, pivoted at 87 to the channel 33—33a and supported by the cross bar 88 on the plunger 90. These horizontal levers have a raised projection 89 which engages the underside of plate 76 and raises or lowers it in response to plunger 90. When plunger 90 guided by 91 is raised it is apparent that the tension on brake rods 94 and 94a is removed and, on the other hand, when this plunger is lowered, tension is applied to these rods to operate the brakes.

The brakes are applied through a foundation brake gear of which the drawings illustrate a typical example. The brake rod is linked to the shoe rods 95 and 96 which are connected by an equalizer 97 at the bottom and carry the brake shoes 98 and 99 which are also pivotally suspended from the truck frame in the plane of the running wheels as illustrated in Fig. 1.

Differential mechanism

The differential mechanism is illustrated in Fig. 8, the motor shaft 101 is pivoted in bracket 17 and carries the bevel gear 102. The planetary member 93, hereafter called the eccentric is pivoted on the shaft of the driven gear 20 and the latter rotates integral with the bevel gear 105. Gear 102 engages gear 103 and gear 105 engages gear 104. Gears 103 and 104 are rigidly connected on the same shaft and rotate in the planetary member 93. This secures a gear reduction between the armature shaft and the driven member 20. The periphery of 93 is eccentric having a large and a small side with relation to the centre of shaft 101.

A stop pin 106 is provided on the eccentric 93 which engages a lug 107 on the bracket 17, Fig. 2. This permits the eccentric to make a single revolution in either direction before it becomes rigidly locked and secures a lost motion in the drive which is proportional to the gear ratio of the mechanism.

By the well-known principle of the differential mechanism, the planetary member, in its movement, takes up the difference between the driving and driven element so that the lost motion in the eccentric is taken up by the difference in speed between the motor armature and the gear 20. The apparatus is so arranged that when the armature shaft 101 exceeds the speed of the driven gear 20 the eccentric is moved to the raised position, that is, to the position in which roller 92 which engages 93 raises the plunger 90 to release the tension on brake rods 94—94a. This position is illustrated at 108, Fig. 9 and when this position is reached the eccentric is locked by stop pin 106 against further movement in this direction. The lost motion now being taken up, continued running of the motor propels the truck in the ordinary manner. When the speed of the driven gear 20 is proportionally greater than the speed of the armature, the difference is again taken up by the eccentric but in this case the eccentric moves in the opposite direction and brings the lower section or narrow side 109 under the roller 92 thereby lowering plate 76 and allowing it to rest upon the links 77 and 78 which applies the tension to the brake rods for operating the brakes.

As the truck is driven by the motor, the motor armature in practice, is running at the same speed as the corresponding speed of the driven gear and a reduction in speed of the armature or an excess in speed of the driven gear occurs gradually and the eccentric changes its position by a gradual movement which is translated to the brakes through a gradual action cushioned by the spring 75. This gradual application of the brakes will reduce the speed of the driven gear to the corresponding speed of the armature or less. The continued movement of the armature then tends to raise the eccentric and release the brakes and when the driven gear again exceeds the corresponding speed of the armature the brakes are applied and the operation is repeated. The brakes are thus alternately applied and released as the motor armature loses its momentum or as the driven mechanism tends to exceed the corresponding predetermined speed of the motor. It should be noted that raising the eccentric with its load tends to dampen the movement of the armature.

If a truck is stopped and then starts up without the motor running, the driven gear 20 will exceed the speed of the motor and the brakes will, immediately be applied and remain applied until the motor is started to propel the truck. It will be noted that the trucks are universal in design and symmetrical about the transverse centre and constitute a multiple unit which may be run in either direction. When a truck is stopped the narrow side of the eccentric is supporting roller 92 and if the direction of rotation of the motor is reversed the eccentric then moves in the opposite direction under the conditions above specified. The first movement of the motor therefore moves the eccentric through a revolution until pin 106 engages lug 107 on its opposite side, and the roller 92 is supported on the other half of the eccentric in the raised position. In this position the eccentric is locked and the motor drives the truck in the manner described and the braking mechanism is brought into operation and released by the opposite half of the eccentric as previously described by the difference in speed between the driving and driven devices.

Attention is called to the fact that if a continued difference in speed is maintained in excess of the motor the eccentric will move from the raised position to the lowered position applying the brakes to the fullest extent and further movement of the eccentric will bring it into the raised position again thereby releasing the brakes and holding them released until the motor is started at a speed in excess of the driven mechanism. In practice this condition does not occur because the brakes are powerful enough to stop the mechanism before the lowered position of the eccentric is reached. If the eccentric were used on a mechanism driven in one direction only then a stop could be provided limiting its movements between the high and low positions only or through a semicircle.

If the brakes are applied with sufficient power to stop the driven mechanism and cause the wheels to slip, then the momentum of the motor whose speed is in excess of the driven mechanism immediately operates to raise the eccentric and release the brakes and continues to do so until the slipping ceases. The differential mechanism shown is of the standard type in common use, other types, however may be used having the structure defined in the appended claims.

Trains

The term truck has been used herein for an individual unit capable of running on its own wheels. A car is made up of a body frame 51 coupled to a pair of trucks and a train is made up of a plurality of bodies and trucks coupled together as shown in Fig. 11. The coupling is made through the king pin by the coupling arms as previously described. The frames are provided with rollers 112 and 113 which engage the bumpers of the trucks and thus absorb the shock that may arise in a train. For the same reason the coupling block 58 is slidable against a spring to take up the drawbar pull, however, it should be noted that if all trucks are provided with motors and brakes they each operate as independent units and under ordinary conditions there is little shock or drawbar pull to be absorbed.

The load on the coupling arms is taken up on the bolster. The end trucks support one coupling arm and the intermediate trucks support two coupling arms as indicated at a, b and c, Fig. 11. The entire load is supported by the coupling arms and if this load is not equally distributed in the container then the weight supported by each arm will be proportional to the moments of the load.

The actual power necessary to apply the brakes to the extent desired depends upon several factors including the coefficient of friction between the brake shoe and the wheel and the arrangement of the levers. In practice it is believed that less than 10% of the total weight on the bolster will satisfactorily operate the brakes, spring 75 therefore, would bear this relation to springs 73 and 74 and this spring would have to be overcome by the motor when releasing the brakes. It is evident that the weight on the bolster is distributed between the supporting springs 73, 74 and 75, therefore the pressure on 75 is proportional to the load, hence the brakes are applied proportionally to the load and to the adhesion between the wheel and the running rail.

The system described includes a method of supplying the braking power from the weight of the load and operating the brakes through a lost motion effect in the drive; either of these effects, however, may be used by themselves in a braking system and independently of each other.

Car wiring

The wiring of a car truck will be understood from Fig. 12. The wheels are represented by 11. Power is obtained from contactor 44 through wire 151, contact 152 of relay 162, and wire 153 to armature of motor 18.

The block contactor 45 connects to switch 160 by wire 159 and by wire 161 connects to block relay 162 and thence by wire 172, to ground return on wheels 11. Block contactor 46 connects to switch 171 by wire 170 and thence by wire 172 to ground. Switches 160 and 171 reverse the functions of the block contactors 45 and 46 as is necessary for the operation of the block system when the direction of running is changed. The motor field is indicated at 201 and is controlled by the reversing switch 203 and connects by wires 202 and 204 to the motor armature, the latter wire being grounded on connection 206. This switch is necessary to control the direction of running of the motor when the truck is coupled with another truck to form a car.

Contactor 47 connects by wire 178 to switch selector 180 which also connects by wire 179 to contactor 48. The operation of the switch selector is fully described in U. S. Patent 1,381,317, issued June 14, 1921, and no further reference thereto is deemed necessary at this time.

The track wiring

A track layout for cars wired as in Fig. 12 is shown in Fig. 13. The track rails are indicated by 181 and 182. The power feed wire is shown at 183 and is connected at 185 with the power supply wire 184. It is also connected with the power supply wire 186 through the resistance 188 by wire 187. There will therefore be a voltage drop in wire 186 due to the resistance 188 which is variable and will cause the motor to run at a lower speed when supplied by power from this wire. This will force a lower speed limit when running on this section as may be required on curves or elsewhere where a low speed is desirable.

The contactor 44 connects with the power supply wire 184, 46 connects with the block wire 190 and 45 connects with the block wire 189. Block wires 189 and 190 connect at the divisions of the blocks as shown and block wire 190 is energized by wire 191 connecting to the power feed, through reactance coil 192 and wire 193. This energizes wire 189 for the block in the rear. When contactor 46 engages 190 with switch 171 in the position shown this wire is grounded through wire 172 and the car wheel. When contactor 45 engages block wire 189 with switch 160 in the position shown, if this wire is energized, relay 162 will be energized and contact 152 will be closed supplying power to the motor and establishing running condition. But if a car is in the block ahead wire 190 is grounded and wire 189 is deenergized so that the block relay is thereby substantially deenergized and the power is cut off from the motor until the block ahead clears when relay 162 is again energized to establish running conditions. If the truck should be turned around on the track, switches 160 and 171 should be reversed to adjust the control of the block relay 162 to this condition. This block system is more fully described for A. C. and D. C. operation in U. S. Patent 1,617,402, issued Feb. 15, 1927.

This application is restricted to braking systems and their control, other features of the invention as originally disclosed herein are the subject of the following divisional applications, or continuing applications; Serial No. 168,189, filed Feb. 14, 1927, multiple unit control for electric railway systems, etc.; Serial No. 189,717, filed May 7, 1927, truck and vehicle construction, etc.; Serial No. 379,296, filed July 18, 1929, block system; Serial No. 458,736, filed May 31, 1930, braking system for hoists, etc.

Having thus described my invention, I claim:

1. A mechanism including a self contained braking system comprising a driving element, an element driven by said driving element, a gravity brake for said driven element, there being a limited free movement between said driving element and said driven element and means for gradually operating said brake as said free movement is taken up.

2. A mechanism as described comprising a driving element, an element driven by said driving element, a brake for said driven element, there being a limited free movement between said driving element and said driven element and means for gradually storing energy for operating said brake as said free movement is taken up, said driving and driven elements being self contained in said mechanism.

3. A mechanism as described comprising a driving element, an element driven by said driving element, a brake for said driven element, a stored source of energy for operating said brake, there being a limited free movement between said driving element and said driven element and self contained means for gradually releasing said brake as said free movement is taken up.

4. A mechanism as described comprising a driving element, an element driven by said driving element, a third element gear driven by said driving and driven elements, a brake for said driven element, there being a limited free movement between said driving element and said driven element and means for applying said brake by said third element as said free movement is let out.

5. A mechanism as described comprising a driving element, an element driven by said driving element, a brake for said driven element, there being a limited free movement between said driving element and said driven element and a stored source of energy for operating said brake as said free movement is taken up and self contained means for gradually applying said brake from said energy as the free movement is let out.

6. A mechanism as described comprising a rotary driving element, an element driven by said driving element, a brake for said driven element, there being a limited free movement between said driving element and said driven element, a stored source of energy for operating said brake and means for controlling said energy as said free movement is varied.

7. A mechanism as described comprising a rotary driving element, an element driven by said driving element, a brake for said driven element, a stored source of energy for operating said brake, there being a limited free movement between said driving element and said driven element and means for varying the application of said brake as said free movement is varied.

8. A mechanism as described comprising a rotary driving element, an element driven by said driving element, a brake for said driven element, there being a limited free movement between said driving element and said driven element and means whereby the preliminary movement of said driving element operates to release said brake and to store energy for applying said brake.

9. A mechanism as described comprising a driving element, an element driven by said driving element, a third element gear driven by said driving and driven elements, a brake for said driven element, there being a limited free movement between said driving element and said driven element and means for operating said brake by said third element as the speed of one of said elements is varied relative to the speed of the other element.

10. A mechanism as described comprising a driving element, an element driven by said driving element, a brake for said driven element, there being a limited free movement between said driving element and said driven element and self contained means for operating said brake by a continuous graduated action throughout in proportion to variations in said free movement.

11. A mechanism as described comprising a driving element, an element driven by said driving element, a brake for said driven element, there being a limited free movement between said driving element and said driven element and self contained means for operating said brake by a gradual continuous action controlled by the difference in the momentum of said elements.

12. A mechanism including a braking system comprising a driving and a driven element, a differential mechanism having a planetary member associated with said elements, the planetary member of said differential mechanism operating said braking system.

13. A mechanism including a braking system comprising a driving and a driven element connected through a differential mechanism, whereby the one element has a limited motion independently of the other and means operatively connecting the planetary member of said differential mechanism with said braking system.

14. A mechanism including a braking system comprising a driving and a driven element connected through a differential mechanism and an eccentric associated with the planetary member of said differential mechanism controlling said braking system.

15. A mechanism including a braking system comprising a driving and a driven element connected through a differential mechanism, the planetary member of said differential mechanism formed on an eccentric and controlling said braking system through a graduated movement.

16. A mechanism including a braking system comprising a driving and a driven element connected through a differential mechanism having a planetary member and means whereby the planetary member of said differential mechanism operates said braking system in response to variations in speed between said driving and driven elements.

17. A mechanism including a braking system comprising a plurality of moving elements connected through a differential mechanism having a planetary member and means whereby the planetary member of said differential mechanism operates said braking system in response to variations in speed between said elements.

18. A mechanism including a braking system comprising a plurality of moving elements connected through a differential mechanism having a planetary member, the planetary member of said differential mechanism operatively connected with said braking system, said planetary member having a limited free rotary movement.

19. A mechanism including a braking system comprising a plurality of moving elements connected through a differential mechanism having a planetary member, the planetary member of said differential mechanism operatively connected with said braking system, said planetary member having a limited free rotary movement in both directions.

20. A mechanism including a braking system comprising a plurality of moving elements connected through a differential mechanism having a planetary member, an eccentric associated with the planetary member of said differential mechanism and operatively connected with said braking system, said planetary member having a limited free rotary movement.

21. A mechanism supporting a load and including a braking system comprising a rotary driving element and a driven element operatively connected through a lost motion and means for operating said braking system by said load as the lost motion is varied.

22. A mechanism supporting a load and including a braking system comprising a rotary driving element and a driven element operatively connected, through a lost motion, means for placing said load in position for operating said brakes when said mechanism is started and means for controlling the operation of said brakes as the lost motion is varied.

23. A mechanism supporting a load and including a braking system comprising a rotary driving element and a driven element operatively connected, means for placing said load in position for operating said braking system when said mechanism is started and means for operating said braking system by said load when said driving element ceases to drive.

24. A mechanism supporting a load and including a braking system comprising a rotary driving element and a driven element operatively connected, means whereby a preliminary movement of said driving element releases said braking system and means whereby said braking system is applied by said load when said driving element ceases to drive.

25. A mechanism supporting a load and including a braking system comprising a rotary driving element and a driven element operatively connected, means whereby a preliminary movement of said driving element releases the brakes of said braking system and means for holding said brakes released while said driving element continues to drive, said braking system operated by said load.

26. A mechanism supporting a load and including a braking system comprising a driving and a driven element operatively connected, means for operating said braking system proportional to said load and means including said elements for controlling said braking system to obtain a continuous graduated braking effect.

27. A mechanism supporting a load and including a retarding system comprising a rotary driving element and a driven element operatively connected and having an eccentric associated therewith, said load operating said retarding system and means whereby said driving element raises said load at starting.

28. A mechanism supporting a load and including a braking system comprising a rotary driving element and a driven element operatively connected, said driving element holding said load in a raised position while it is driven and releasing said load from this position to apply the brakes when it ceases to be driven.

29. A mechanism for braking a railway vehicle comprising a truck with a spring supported load, a braking system operatively connected with said load, means for operating said braking system proportional to said supported load, a trackway for said truck and graduated means for automatically controlling said braking system from the trackway.

30. A mechanism for braking a railway vehicle comprising a truck with a spring supported load, a foundation brake for said truck, a member connecting said brake with said load whereby the brake is operated proportional to the load and self contained means carried by said truck for operating said mechanism to apply the brakes.

31. A mechanism supporting a load and including a braking system comprising a rotary driving element and a driven element operatively connected, said braking system operated by said load, means for releasing said braking system when the speed of the driving element exceeds the corresponding speed of the driven element.

32. A mechanism supporting a load and including a braking system comprising a plurality of rotating elements connected through a differential mechanism, said load operating said braking system, and means whereby said differential mechanism raises said load to prevent the application of said brakes.

33. A mechanism supporting a load and including a braking system comprising a plurality of rotating elements connected through a differential gear having a planetary member, said load operating said braking system, the planetary member of said differential gear controlling a support for said load.

34. A mechanism supporting a load and including a braking system comprising a plurality of rotating elements connected through a differential gear having a planetary member, said load operating said braking system, the planetary member of said differential gear formed on an eccentric and arranged to control a support for said load.

35. A mechanism supporting a load and including a braking system comprising a plurality of rotating elements connected through a differential gear having a planetary member, said load operating said braking system, the planetary member of said gear having a limited free rotary movement and controlling a support for said load.

36. A mechanism supporting a load and including a braking system comprising a plurality of rotating elements connected through a differential gear having a planetary member, said load operating said braking system, the planetary member of said gear having a limited free rotary movement and when in one position raising said load to release the brakes and when moved from this position lowering the load to apply the brakes.

37. A mechanism supporting a load and including a braking system comprising a plurality of rotating elements connected through a differential gear having a planetary member, said load operating said braking system as it is raised and lowered and a plunger operated by the planetary member of said gear for raising and lowering said load.

38. A mechanism supporting a load and having an operating motor connected with said mechanism through a differential gear having a planetary member, a braking system operated by said load and means for supporting said load by the planetary member of said gear while said motor is operating said mechanism.

39. In a braking system for a vehicle truck, the combination of a spring supported bolster carrying a load, a plurality of moving elements operatively connected through a differential gear having a planetary member, a braking system operated by the load on said bolster and the planetary member of said differential gear restricting the movement of said bolster.

40. In a braking system for a vehicle truck, the combination of a vertical sliding bolster carrying a load, a sliding member engaging said bolster through a spring, braking gear connected with said sliding member, a plurality of moving elements operatively connected through a differential gear and a lever supporting said sliding member operatively connected with said differential gear.

41. In a braking system for a vehicle truck, the combination of a spring supported bolster, a braking mechanism operatively connected with said bolster, a driving mechanism for said truck including a differential gear, said differential gear operatively connected with said bolster and controlling said braking mechanism.

42. In a braking system for a vehicle truck, the combination of a bolster carrying a plurality of loads of coupled trucks, a braking mechanism operatively connected with said bolster, a driving mechanism for said truck including a differential gear, said differential gear operatively connected with said bolster and controlling said braking mechanism.

43. In a braking system for a vehicle truck, the combination of a spring supported bolster, a braking mechanism operatively connected with said bolster, a driving mechanism for said truck and means for automatically operating said braking system when the driving mechanism ceases to drive.

44. In a braking system for a vehicle truck, the combination of a bolster carrying a plurality of coupled trucks, a braking mechanism operatively connected with said bolster, a driving mechanism for said truck and means for operating said braking system when said driving mechanism is operated at a predetermined speed relative to said truck.

45. In a braking system for a vehicle truck, the combination of a coupling pin, a bolster slidable on said pin, a braking mechanism operatively connected with said bolster, means for driving said truck and means associated with said driving means for controlling said braking system.

46. In a braking system for a vehicle truck, the combination of a combined coupling pin and king pin, a bolster slidable on said pin, a braking mechanism operatively connected with said bolster, means for driving said truck and means for operating said braking system when the driving means ceases to drive.

47. In a braking system for a vehicle truck, the combination of a motor driving said truck through a differential gear, a foundation braking system controlled by said gear, said gear operated by the momentum of said motor and the momentum of said vehicle.

48. In a braking system for a vehicle truck, the combination of a bolster sliding in vertical guides, a lever connected with the centre of said bolster through a spring and a foundation brake gear connected with said lever.

49. In a braking system for a vehicle truck, the combination of a bolster sliding in a vertical guide, a pair of levers connected with the centre of said bolster through a spring and a foundation brake gear connected to each of said levers.

50. In a braking system for a vehicle truck, the combination of a bolster sliding in a vertical guide, a plate connected with said bolster through a spring, a lever connected with said plate and operating a foundation brake gear and independent means restricting the movement of said plate.

51. In a braking system for a vehicle truck, the combination of a motor driving said truck through a differential gear, a braking system controlled by said gear and means whereby a brake application is varied according to the speed of said motor.

52. In a braking system for a vehicle truck, the combination of a plurality of moving elements connected through a differential gear, a foundation braking system controlled by said gear and means whereby said braking system is operative when said vehicle runs in either direction.

53. In a braking system for a vehicle truck, the combination of a bolster supporting a load, a braking mechanism operatively connected with said bolster, means for controlling said brakes and means for varying the brake application according to the grade on which said truck is running.

54. In a braking system for a railway train, the combination of a track with a vehicle thereon, a foundation braking mechanism on said vehicle, a differential gear for operating said braking mechanism and means on the track for controlling one element of said gear.

55. In a braking system for a railway train, the combination of a track with a vehicle thereon, a foundation braking mechanism on said vehicle, a differential gear for operating said braking mechanism and means on said vehicle for operating one element of said gear and means on said track for operating another element of said gear.

56. In a braking system for a railway train, the combination of a track with a vehicle thereon, a foundation braking mechanism on said vehicle, a device on said vehicle driven by the movement of said vehicle and another device driven by means on said track and means for operating said braking mechanism in accordance with variations in the speed of said devices.

57. In a braking system for a railway train, the combination of a track with a vehicle thereon, a foundation braking mechanism on said vehicle, a speed responsive device on said vehicle driven by means on said track for controlling said mechanism, said device varying its control as its speed is varied relative to the speed of said vehicle.

58. In a braking system for a vehicle automatically and remotely controlled, the combination of a braking mechanism and a driving mechanism and means whereby said mechanisms co-operate to obtain a graduated braking effect.

59. In a braking system for a vehicle automatically and remotely controlled, the combination of a braking mechanism and a driving mechanism, said braking mechanism arranged to become gradually effective when said driving mechanism ceases to drive.

60. In a braking system for a railway vehicle, the combination of a track with a vehicle thereon, a braking mechanism on said vehicle and means on the track remotely controlled for causing, automatically, a graduated application of said brakes.

61. In a braking system for a vehicle of a railway train, the combination of a track with a vehicle thereon, a braking mechanism on said vehicle operated independently of the train and means on the track for causing automatically a brake application proportional to the load on said vehicle.

62. In a braking system for a railway vehicle, the combination of a track with a vehicle thereon, a braking mechanism on said vehicle and remotely controlled means on the track whereby said mechanism is automatically operated to produce a graduated application of the brakes proportional to the speed of the vehicle.

63. In a braking system for a vehicle comprising a brake gear and a controlling mechanism, said mechanism arranged to automatically control said brakes according to a predetermined rate of deceleration and means whereby said brakes are released when said predetermined deceleration is exceeded.

64. In a braking system for a vehicle comprising a brake gear and a controlling mechanism, said mechanism arranged to gradually control said brakes according to a predetermined rate of deceleration, applying the brakes as the predetermined rate is approached and releasing the brakes as the predetermined rate is exceeded.

65. In a braking system for a vehicle comprising a braking mechanism and moving means on the vehicle establishing a predetermined deceleration independently of the movement of said vehicle, said moving means controlling the operation of said braking mechanism and remotely located means automatically controlling said moving means.

66. In a braking system for a vehicle comprising a braking mechanism and moving means on said vehicle establishing a predetermined deceleration, said moving means controlling the operation of said braking mechanism and restricting the brake application in accordance with said deceleration and remotely located means automatically controlling said moving means.

67. In a braking system for a railway vehicle, the combination of a track with a vehicle thereon, a braking mechanism on said vehicle and moving means on said vehicle establishing a predetermined deceleration and remotely located means on the track for causing the operation of said mechanism by said moving means.

68. A braking system for a vehicle comprising a braking mechanism and a device on said vehicle having a movement corresponding to but independent of the speed of said vehicle, said device controlling the operation of said mechanism and means remotely located controlling the movement of said device.

69. A braking system for a vehicle comprising a braking mechanism and a device on said vehicle having a movement corresponding to but independent of the speed of said vehicle, an element gear connected to said device and to said vehicle, said element controlling said mechanism to apply the brakes as its speed is relatively lower than the speed of the vehicle and to release the brakes as its speed is relatively greater than the speed of the vehicle.

70. A braking system for a vehicle comprising a braking mechanism and a device on said vehicle having a movement corresponding to but independent of the speed of said vehicle, an element gear connected to said device and to said vehicle, said element controlling said mechanism and varying the brake application as its speed varies relative to the speed of the vehicle.

71. In a braking system, the combination of a driving and a driven mechanism, a braking device for one of said mechanism, moving means gear connected to said driving and driven mechanism for establishing a predetermined deceleration independently of said driven mechanism, said moving means controlling said braking device.

72. A braking system for a truck comprising a frame, a brake gear, a bolster supporting the load, a plurality of vertical guide posts for said bolster with a coil spring on each post resting on said frame and supporting said bolster and an additional spring connecting said bolster with said brake gear.

73. In a braking system for a truck, the combination of a brake gear, a bolster, a spring supporting said bolster, a king pin upon which said bolster slides and yieldable means connecting said bolster with said brake gear.

74. A mechanism including a braking system comprising a driving and a driven element operatively connected through a limited free movement and means operated by gravity for automatically operating said braking system as said free movement is varied without regard to the direction in which said elements are moving.

75. A mechanism including a braking system comprising a driving element and an element driven by said driving element through a gear connected differential mechanism whereby the one element has a comparatively extensive limited motion independently of the other, said differential mechanism controlling said braking system.

76. A braking system for a vehicle comprising a brake gear and a controlling mechanism having a rotating element, said mechanism arranged to control said brake gear according to a predetermined rate of deceleration of said element and remotely controlled means for effecting said brake control.

77. A braking system for a vehicle comprising a brake gear and a controlling mechanism having a rotating element, said mechanism arranged to automatically control said brakes according to a predetermined rate of deceleration of said element, means whereby said brakes are released when said predetermined deceleration is exceeded and remotely controlled means for effecting said brake control.

78. A braking system for a vehicle comprising a brake gear and a controlling mechanism having a moving element, said mechanism arranged to gradually control said brakes according to a predetermined rate of deceleration of said element, applying the brakes as the predetermined rate is approached and releasing the brakes as the predetermined rate is exceeded and remotely controlled means for effecting said brake control.

79. In a braking system for a vehicle, the combination of a driving motor for said vehicle, a bolster supporting a load, a brake gear and means whereby said motor operatively connects said bolster with said brake gear as the brakes are to be applied and releases the brakes as the motor drives the vehicle.

80. In a braking system for a vehicle, the combination of a driving motor for said vehicle, a bolster supporting a load, a brake gear and means whereby said motor operatively connects said bolster with said brake gear as the brakes are to be applied.

81. A braking system for a vehicle comprising a bolster supporting a load, a brake gear yieldingly connected with said bolster and self-contained means on said vehicle for gradually shifting said load to said brake gear as the brakes are to be applied.

82. In a braking system, the combination of a driving element, means for driving said element, a driven element with a brake gear, a supported load and means whereby said driving means operatively connects said supported load with said brake gear as the brakes are to be applied.

83. In a braking system for railway vehicles, the combination of a track with a vehicle thereon, a braking mechanism on said vehicle, means on said vehicle having a normal rate of movement independently of the movement of the vehicle controlling the operation of said braking mechanism and means on the trackway for varying the movement of said moving means whereby said braking mechanism is brought into operation to retard said vehicle.

84. In a braking system for railway vehicles, the combination of a track with a vehicle thereon, a braking mechanism on said vehicle, moving means on said vehicle controlling said braking mechanism to produce a retarding effect on the vehicle as the speed of said moving means is decreased and means on the trackway for varying the movement of said moving means.

85. In a braking system for railway vehicles, the combination of a track with a vehicle thereon, a braking mechanism on said vehicle, moving means on said vehicle moving in correspondence with the vehicle speed controlling said braking mechanism to produce a brake application when said moving means ceases its movement and means on the trackway controlling the movement of said moving means.

86. In a braking system for railway vehicles, the combination of a track with a vehicle thereon, a braking mechanism on said vehicle, moving means on said vehicle controlling said braking mechanism, said moving means having a normal rate of movement which holds the braking mechanism released and which causes a brake application as its rate of movement is reduced below said normal rate and means on the trackway for varying the movement of said moving means.

87. In a braking system for railway vehicles, the combination of a track with a vehicle thereon, a braking mechanism on said vehicle, moving means on said vehicle controlling said braking mechanism to produce a retarding effect on said vehicle as the speed of said moving means is decreased and to apply the brakes when said moving means ceases its movement and means on the trackway for varying the movement of said moving means.

88. In a braking system for railway vehicles, the combination of a track having sections arranged for normal speed and other sections arranged for a permissible speed below normal, a vehicle on said track having a braking mechanism, moving means on said vehicle controlling said braking mechanism, said moving means having a normal rate of movement at which said braking mechanism is held released and below which a retarding effect is produced on said vehicle and means on the normal sections of said trackway for operating said moving means at normal speed and on the other sections of said trackway for operating said means below normal speed.

89. In a braking system for railway vehicles, the combination of a track with a vehicle thereon, a braking mechanism on said vehicle comprising a foundation brake gear, moving means on said vehicle controlling said braking mechanism as its speed of movement is varied and means on the trackway for varying the movement of said moving means.

90. In a braking system for railway vehicles, the combination of a track with a vehicle thereon, a braking mechanism on said vehicle comprising brake shoes and a lever operating said brake shoes, moving means on said vehicle controlling the operation of said lever as the speed of movement of said moving means is varied and trackway means for varying the movement of said moving means.

91. In a braking system for railway vehicles, the combination of a track having sections arranged for normal speed and other sections arranged for speeds below normal, a vehicle on said track having a braking mechanism, moving means on said vehicle controlling said braking mechanism according to its speed of movement and means controlling said moving means according to the speed conditions of said track sections.

92. In a braking system for railway vehicles, the combination of a track with a vehicle thereon, a braking mechanism on said vehicle, moving means on said vehicle controlling said braking mechanism through a lost motion connection as its speed of movement is varied and means on the trackway for varying the movement of said moving means.

93. In a braking system for railway vehicles, the combination of a track with a vehicle thereon, a braking mechanism on said vehicle, means moving independently of said vehicle controlling said braking mechanism through a lost motion connection and operating to apply the brakes as the lost motion is taken up and means on the trackway for varying the movement of said moving means.

94. In a braking system for railway vehicles, the combination of a track with a vehicle thereon, a foundation braking mechanism for said vehicle and means automatically operative for gradually applying the brakes and for partially releasing the brakes when the braking force exceeds the adhesion between the wheels of said vehicle and the rails of the track.

95. In a braking system for a railway vehicle, the combination of a track with a vehicle thereon, a braking mechanism for the wheels of said vehicle, means for automatically operating said braking mechanism from the track and means automatically operative for gradually releasing said brakes as said wheels slip on the rails.

96. In a braking system for a railway vehicle, the combination of a track with a vehicle thereon, a braking mechanism for the wheels of said vehicle, means controlling said braking mechanism from the trackway and means automatically operative to release said brakes as said wheels slip on the rails.

97. In a braking system for a railway vehicle, the combination of a track with a vehicle thereon, a braking mechanism for the wheels of said vehicle, means controlling said braking mechanism from the trackway and means automatically operative for controlling said braking mechanism proportional to the adhesion between the wheels of said vehicle and the rails of said track.

98. In a braking system for railway vehicles, the combination of a track with a vehicle thereon, a braking mechanism on said vehicle, a driving motor on said vehicle controlling said braking mechanism through a lost motion connection and means on the trackway for varying said lost motion connection.

99. In a mechanism as described, the combination of a driving mechanism including a motor, a driven mechanism, a differential mechanism with a planetary member connecting said driving and driven mechanisms, said planetary member having a limited free movement and means controlling said motor.

100. In a mechanism as described, the combination of a driving mechanism including a motor, a driven mechanism, a differential mechanism with a planetary member connecting said driving and driven mechanisms, said planetary member having a limited free movement, means retarding the movement of said planetary member and means controlling said motor.

101. In a mechanism as described, the combination of a driving mechanism including a motor, a driven mechanism, a differential mechanism with a planetary member connecting said driving and driven mechanisms, said planetary member having a limited movement and arranged to lift a load and means controlling said motor.

102. In a mechanism as described, the combination of a driving mechanism including a motor, a driven mechanism, a differential mechanism with a planetary member formed on an eccentric and arranged to lift a load connecting said driving and driven mechanisms and means controlling said motor.

103. In a mechanism as described, the combination of a driving mechanism including a motor, a driven mechanism, a differential gear having a planetary member connecting said mechanisms, the planetary member of said differential gear having a limited movement and means whereby the starting torque of said motor operates through a graduated action to take up the movement of said planetary member and to start said mechanism.

104. In a mechanism as described, the combination of a driving mechanism including a motor, a driven mechanism, a differential gear having a planetary member connecting said mechanisms, the planetary member of said differential gear having a limited movement and means whereby the starting torque of said motor is distributed to take up the movement of said planetary member and to start said driven mechanism according to the resistance of said member and said driven mechanism.

105. In a mechanism as described, the combination of a driving mechanism including a motor, a driven mechanism, a differential gear having a planetary member connecting said mechanisms, the planetary member of said differential gear having a limited free movement and means whereby said motor takes up the limited movement of said member as the driven mechanism is started and restores the limited free movement of said member as the mechanism is stopped.

106. A vehicle truck as described comprising a driving motor, and a differential mechanism operatively connecting said motor with said truck, the planetary member of said differential mechanism having a planetary member having a limited movement in either direction and means for taking up said limited movement as the speed of said motor is greater or less than the corresponding speed of said truck.

107. A vehicle truck as described comprising a driving motor, a differential mechanism operatively connecting said motor with said truck, the planetary member of said differential mechanism having a planetary member having a limited movement and means associated with said planetary member for raising the load on said truck.

108. A vehicle truck as described comprising a driving motor, a differential mechanism having a planetary member operatively connecting said motor with said truck, the planetary member of said mechanism having a limited movement, an eccentric associated with said planetary member and means for retarding the movement of said planetary member.

109. A vehicle truck as described comprising a driving motor, a differential mechanism having an eccentric associated therewith operatively connecting said motor with the running wheels of said truck and means whereby the starting torque of said motor operates to raise the load on said truck and to start said truck.

110. A mechanism as described comprising a driving mechanism including a motor, a driven mechanism, a differential gear connecting said mechanisms, means whereby said motor at starting operates to raise a load and start said driven mechanism and to lower the load at stopping.

111. An article of manufacture comprising a differential mechanism having a driven element and a driving element connected by a planetary member, said planetary member having a limited free movement and having a cam formed thereon.

112. An article of manufacture comprising a differential mechanism having a planetary member and a plurality of gears connected therewith through a floating connection, said planetary member having a limited free movement and having a cam formed thereon.

113. A self-contained driving and retarding system for vehicles comprising a body and running wheels, a rotary driving element, a floating member connecting said driving element with said running wheels and raised as the speed of the driving element varies with respect to the corresponding speed of said running wheels, a spring supporting said body, a supporting member connected with said spring and a roller on said supporting member engaging said floating member whereby said body is raised and lowered by the movement of said floating member.

114. A self-contained driving and retarding system for vehicles comprising a body and running wheels, a rotary driving element, a floating member connecting said driving element with said running wheels and raised as the running wheels encounter resistance, a spring supporting said body, a supporting member for said spring and a roller on said supporting member engaging said floating member to raise said body as the vehicle is started.

Signed at New York, N. Y., this 18th day of June 1924.

MATTHEW H. LOUGHRIDGE.